US005864297A

United States Patent [19]

Sollestre et al.

[11] Patent Number: 5,864,297

[45] Date of Patent: Jan. 26, 1999

[54] REPROGRAMMABLE REMOTE KEYLESS ENTRY SYSTEM

[75] Inventors: Rey A. Sollestre, West Bloomfield; Patrick Dean, Armada; Gary F. Kajdasz, West Bloomfield; Gary B. Flaishans, Clarkston, all of Mich.

[73] Assignee: Chrysler Corporation, Auburn Hills, Mich.

[21] Appl. No.: 621,168

[22] Filed: Apr. 20, 1995

Related U.S. Application Data

[63] Continuation-in-part of Ser. No. 357,501, Dec. 16, 1994, abandoned.

[51] Int. Cl.[6] .......... H04Q 7/00

[52] U.S. Cl. .......... 340/825.31; 340/825.69

[58] Field of Search .......... 340/825.31, 825.22, 340/825.69, 825.72, 426; 361/172; 80/287

[56] References Cited

U.S. PATENT DOCUMENTS 4,754,255 6/1988 Sanders et al. .......... 340/426
4,881,148 11/1989 Lambropoulos et al. .......... 161/172
5,049,867 9/1991 Stouffer .......... 340/426
5,535,844 7/1996 Samford .......... 180/287
5,543,776 8/1996 L'Esperance et al. .......... 340/426

*Primary Examiner*—Edwin C. Holloway, III
*Attorney, Agent, or Firm*—Roland A. Fuller, III

[57] ABSTRACT

A remote keyless entry system includes a remote key fob or transmitting unit which may be carried by the operator. This fob may transmit coded function signals directing the vehicle to perform requested functions, e.g. unlock the doors, and an on-board receiver that receives the request and performs the function. The receiver may be reprogrammed by the customer to accept signals from a different transmitter in the event that a key fob is either lost or stolen. To program the receiver, the system is put in a programming mode by using a transmitter whose security code is already stored within the receiver. This programming mode is entered by depressing specified buttons on the transmitting unit for a predetermined amount of time. Once in the programming mode, all previous security codes are erased, and a new transmitting unit code may be programmed into the receiver by depressing any button on that unit. The receiver will chime to acknowledge to the customer that the new security code has been accepted.

8 Claims, 6 Drawing Sheets

FIG. 2A
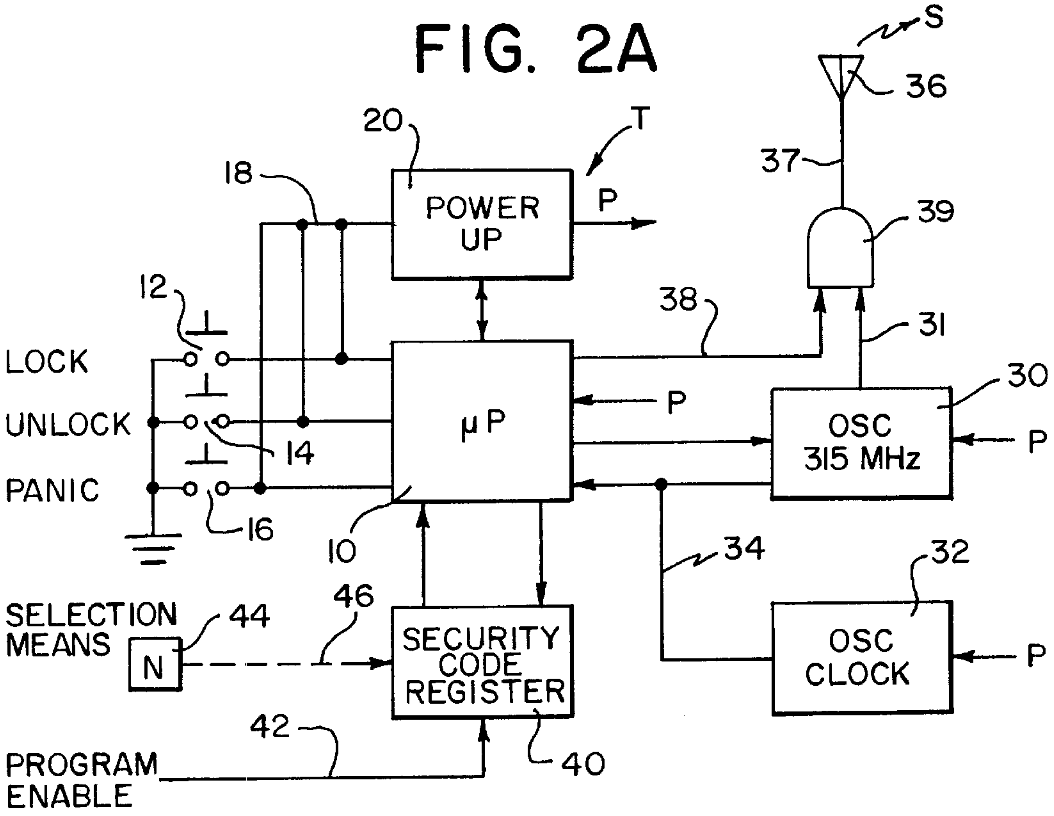
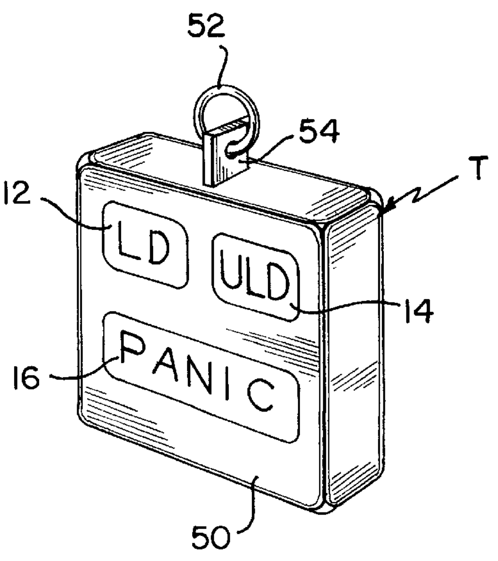
FIG. 3

FIG. 2B
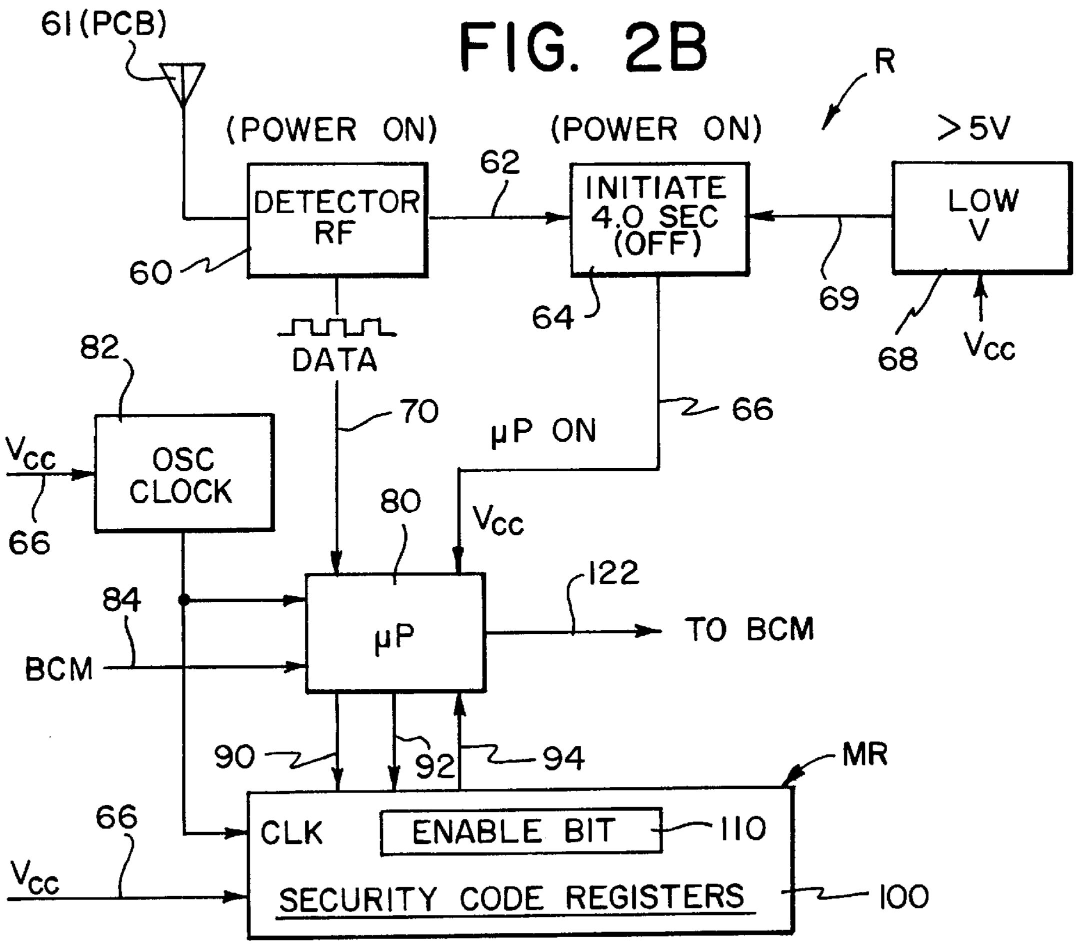
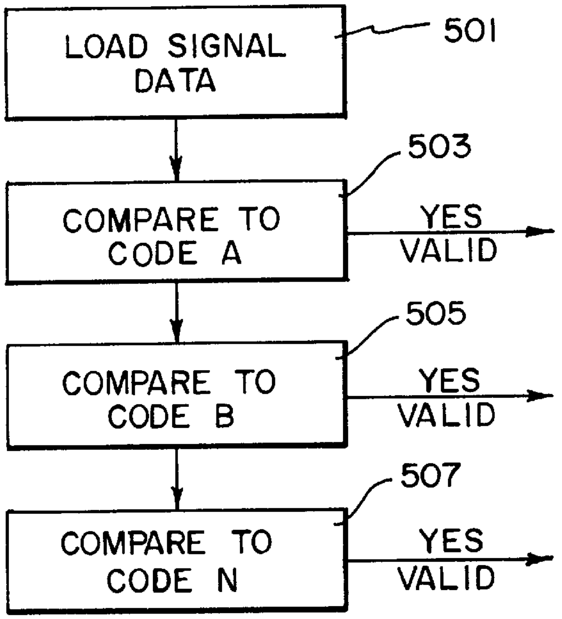
FIG. 6

REPROGRAMMABLE REMOTE KEYLESS ENTRY SYSTEM

This is a continuation-in-part of U.S. application Ser. No. 08/357,501, filed Dec. 16, 1994, abandoned.

FIELD OF THE INVENTION

This invention relates to a keyless entry system, and more particularly, to an improved remote keyless entry system that can be reprogrammed by the customer, without the assistance of the manufacturer or the dealer.

BACKGROUND OF THE INVENTION

Keyless entry systems are known in the art and are used, among other things, to gain access to a host of devices including automobiles, marine vehicles and garage doors. Presently available keyless entry systems include devices which have a numerical keypad located on an exterior surface or panel of, for example, the door of a vehicle or a garage. The operator enters a unique multiple digit code on the keypad to automatically unlock the vehicle or open the garage. In certain keyless entry systems, it is possible for an authorized user or customer to change the access code. However, this requires the authorized user or customer to physically input commands into the keypad. For example, U.S. Pat. No. 4,809,199 ("the '199 patent") describes a keyless marine access and engine control system having a primary and a secondary access code, either of which may be entered through a keypad to gain access to the marine vehicle. The secondary access sequence may be changed by a person who knows either the primary access sequence or the secondary access sequence. The primary access sequence can be reprogrammed through the keypad after a switch located in a secure location on the vehicle has been activated for a predetermined length of time. Thus, the primary access sequence can only be changed by a person having knowledge of both the present primary access sequence and the physical location of the reprogramming switch. Although the primary access code may be changed by an authorized user or customer, this requires (a) having an external keypad, (b) knowing the physical location of the reprogramming switch, and (c) memorizing the primary access sequence. A similar system used for automatic garage door openers is described in U.S. Pat. No. 5,252,960.

Like the '199 patent, U.S. Pat. No. 4,492,959 describes a keyless entry system having an input unit for entering either a permanent code or a user code. The input unit is generally located on the external door handle or other surface of the vehicle. Although the user code may be changed by an authorized user or customer knowing the permanent code, the permanent code is preset in the system and cannot be changed by the customer. A further disadvantage of the system described in the '959 patent is that an input device attached to the vehicle is still required.

The above-discussed patents do not disclose remote control entry systems, as opposed to key-less entry systems in that a keypad or some other input device is required to input the security code into the system. Actual remote keyless entry systems are disclosed in U.S. Pat. Nos. 5,319,364 and 5,109,221, hereinafter the '364 and the '221 patents respectively. A passive remote keyless entry system is disclosed in the '364 patent where the operator carries a portable transmitter which includes a motion sensing switch that automatically activates the transmitter whenever movement of the transmitter is sensed. The transmitter corresponds to a receiver located in the vehicle which is adapted to unlock the vehicle whenever the coded radio frequency signal or a coded optical signal is received from the transmitter.

A new transmitter identification code may be programmed into the controller by having authorized service personnel ground the "program" input line, and then bring the transmitter within range of the receiving antenna. The identification code from the transmitter is then automatically read by the microcomputer into the EEPROM. Therefore, if a transmitter is lost, a new transmitter with a different identification code can be provided and the new transmitter identification code programmed into the receiver/controller by authorized service personnel. However, there is still no convenient way for an authorized user or customer to reprogram the identification code without going to the dealer and having the dealer program in the new transmitter identification code.

The remote control system disclosed in the '221 patent is similar to the '364 patent, but without the "passive" feature. A new transmitter identification code may also be programmed into a receiver by having authorized service personnel first ground a program input line, and then depress any function switch on the transmitter. Like the '364 disclosure, the '221 invention, suffers from the same disadvantage of not being reprogrammable by an authorized user or customer in the event that the transmitter is either lost or stolen. As with the '364 patent, the '221 patent requires that the authorized user or customer return to the dealer to have a new transmitter programmed into the receiver unit of the system.

SUMMARY OF THE INVENTION

The present invention is directed towards a remote keyless entry system which may readily be programmed by an authorized user or customer without the assistance of a dealer. This invention is an improvement over the '221 patent which is incorporated herein by reference.

The remote keyless entry (hereinafter "RKE") system comprises a RKE transmitter or "key fob," a receiving unit or receiver mounted in a secure location in the vehicle, an antenna suitably mounted on the vehicle, and a body controller module ("BCM"). The antenna and the receiver may be in a single unit. The RKE transmitter, when activated, sends out a coded signal that comprises at least a transmitter vehicle access code ("VAC") and a function code. The receiver compares the VAC with each internally stored code, and if a positive match is made, a serial message is sent to the BCM to perform the requested function.

In the event that the RKE transmitter is either lost or stolen, the RKE system allows the customer/authorized user to reprogram the receiver to accept a new transmitter VAC by using an authorized RKE transmitter. An authorized transmitter is one that has previously been programmed and is, therefore, recognized by the receiver. The reprogramming is accomplished without the assistance of a dealer.

The RKE system is put in the programming mode by turning on the ignition switch of the automobile, and by depressing certain function keys located on the RKE transmitter for a minimum period of time (depressing the unlock button for a minimum of 5 seconds and a maximum time of 10 seconds, and depressing the panic button within this 5–10 second interval). In response to these signals from the transmitter, the RKE receiver sends a request to enter "program mode," to the BCM via a serial message. The BCM, in turn, checks for the predetermined conditions, for example, whether the ignition switch is on. If the predetermined conditions are met, the BCM grounds the RKE program line, and allows the RKE receiver to enter the "program mode." The BCM will sound a long chime to let the customer know that the system is ready to be reprogrammed.

Once in the "program mode," the customer may depress any function key on the new RKE transmitter to be programmed, which sends the VAC of that transmitter to the RKE receiver, where it is stored. The new VAC is loaded into all of the memory registers ("MRs") within the RKE receiver, thus erasing all the old VACs. If the RKE transmitter used to access the programming mode (authorized RKE transmitter) is still intended to be used, then this RKE transmitter must also be reprogrammed into the RKE receiver along with any other new RKE transmitters. In a preferred embodiment of the invention, up to 4 VACs may be stored in the MRs.

After each RKE transmitter is programmed, the receiver transmits a "transmitter programmed" message to the BCM. The BCM sounds a short chime to acknowledge to the customer that the transmitter has been successfully programmed. If there are no additional transmitters to program, the BCM ends RKE programming by pulling the RKE program line "high" after either a predetermined time has elapsed, or the automobile ignition is turned off. Finally the BCM signals the customer that the program mode has ended, by sounding a long chime.

BRIEF DESCRIPTION OF THE DRAWINGS

The foregoing and other features of the present invention will be more readily apparent from the following detailed description and drawings of an illustrative embodiment of the invention in which:

FIG. 2 is a block diagram illustrating schematically the transmitting unit and receiver unit;

FIG. 3 is a pictorial view of the transmitting unit in the form of a key holder;

FIG. 6 is a flow chart illustrating the compare logic within the Memory Registers.

DESCRIPTION OF A PREFERRED EMBODIMENT

The Remote Keyless Entry ("RKE") system described herein is an improvement over that disclosed in U.S. Pat. No. 5,109,221 which is incorporated herein by reference. The operation of the RKE system is similar to the '221 patent unless otherwise specified, or unless inconsistent with this invention as hereafter described.

Figure 1:
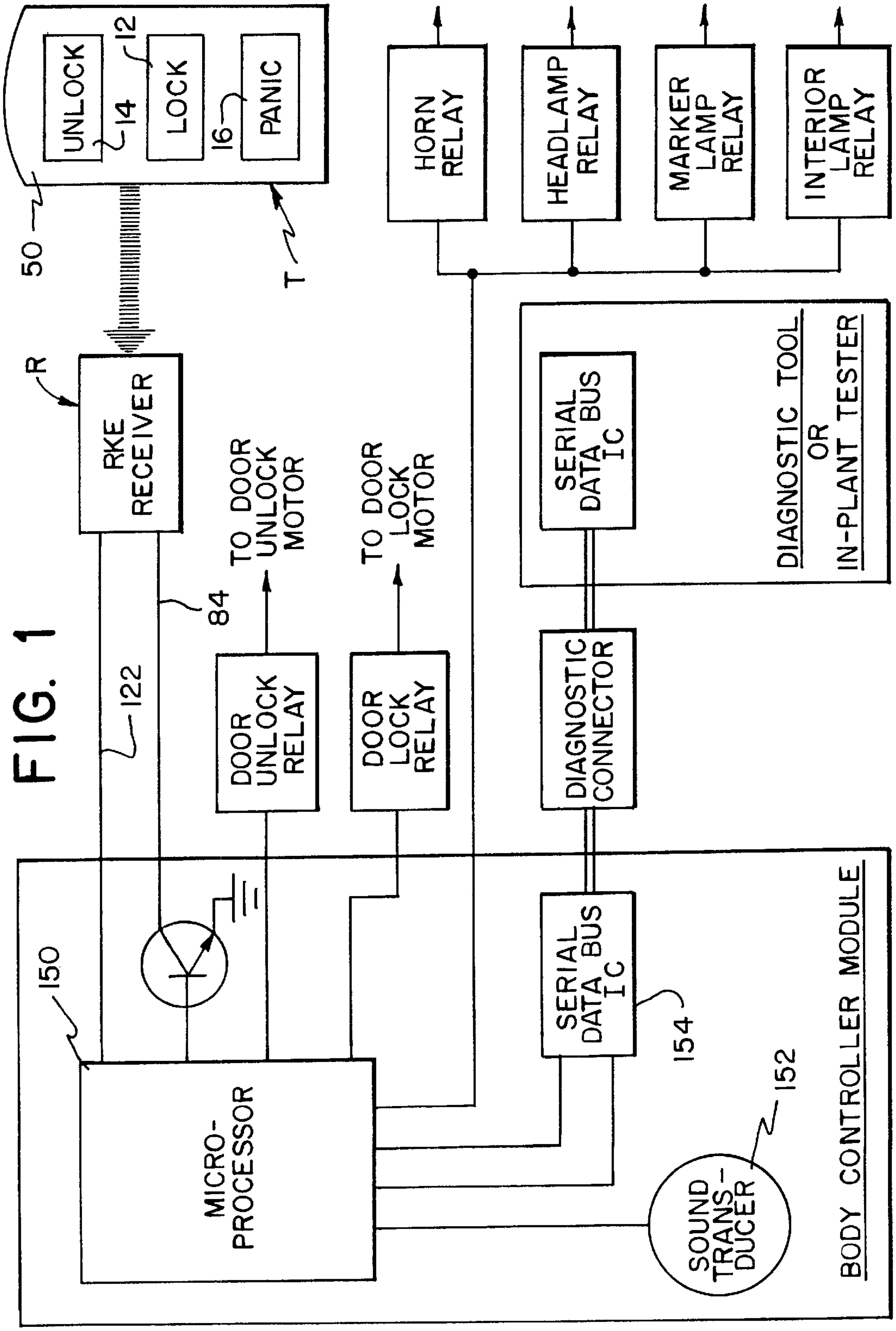
FIG. 1 is a block diagram illustrating schematically the RKE system as it interfaces with the Body Controller Module according to the present invention.

FIG. 1 shows, in general, how the RKE system interfaces with a Body Controller Module of a motor vehicle. In particular, it illustrates a transmitting unit T or key fob, referred to herein as the RKE transmitter T, a receiving unit R (the "RKE receiver") which has an internal antenna, and a body controller module ("BCM").

The RKE transmitter T, (shown enlarged in FIG. 3 as a key fob) has: (1) a lock button 12 which corresponds to the lock switch 12 (FIG. 2); (2) an unlock button 14 corresponding to the unlock switch 14 (FIG. 2); and (3) a panic button 16 corresponding to the panic switch 16 (FIG. 2). The RKE transmitter T (key fob) is small enough to be carried on the person of the customer. When the RKE transmitter T is activated from within a specified distance from the vehicle, it transmits a coded signal to the RKE receiver R. The RKE receiver R decodes the signal and supplies a serial message corresponding to the depressed function switch to the BCM via serial data line 122.

As shown in FIG. 1, the BCM comprises a BCM microprocessor ("$\mu$P") 150, a sound transducer 152, and a serial data bus IC 154. The BCM $\mu$P 150 processes the function signal and commands the vehicle to perform the requested function, for example, locking and unlocking the vehicle doors. With respect to this invention, the sound transducer 152 serves primarily to alert the customer to the programming phases. For example, when the system enters the "program mode," the BCM sounds a long chime tone, thereby signalling the customer that the "program mode" has been entered. In general, the serial data bus IC 154 provides the data transfer interface between the microprocessors of different modules. Descriptions of the vehicle system, data types, message formats, hardware interfacing requirements, and bus speeds are all transmitted from one microprocessor to the next via the various serial data bus ICs 154. In the BCM, the serial data bus IC 154 communicates the initial programming message to the BCM $\mu$P 150, which in turn grounds the program enable line 84 to permit system programming.

FIG. 2 illustrates the RKE transmitter T and the RKE receiver R in greater detail. Referring to FIG. 2, the RKE transmitter T includes a custom transmitter $\mu$P 10 having appropriate internal PROMs and RAMs programmed to perform the functions of the system. The RKE transmitter T also has sufficient input and output terminals controlled by the function switches 12, 14 and 16. For example, depressing the "lock" function switch 12 operates the vehicle locking mechanism and locks the doors of the vehicle. Likewise, depressing the "unlock" function switch 14 unlocks the vehicle doors.

In a preferred embodiment, when the lock function switch 12 is depressed, a single transmission of a coded signal is sent. Thereafter, the circuit is deactivated to await a new requested function. When the unlock function switch 14 is depressed, a single data transmission is initiated to unlock the vehicle door(s). If the panic button 16 has been depressed, then the RKE transmitter T sends out a signal to place the vehicle into the "panic mode." The "panic mode" is a safety feature, the primary purpose being to draw attention to the vehicle. When the panic button 16 is depressed, the vehicles headlamps and markerlamps flash, the horn pulses, and the interior lamps illuminate. This condition persists for three (3) minutes or until either the panic button 16 is depressed again, or the ignition switch is turned on.

The panic button 16 is also used, in conjunction with the unlock button 14, to put the vehicle into the "program mode." This programming function is described more fully below. The above-described function switches are merely illustrative, and other function switches may be chosen to perform numerous tasks with respect to the vehicle, including reprogramming the receiver R to accept new RKE transmitters T.

Figure 4:
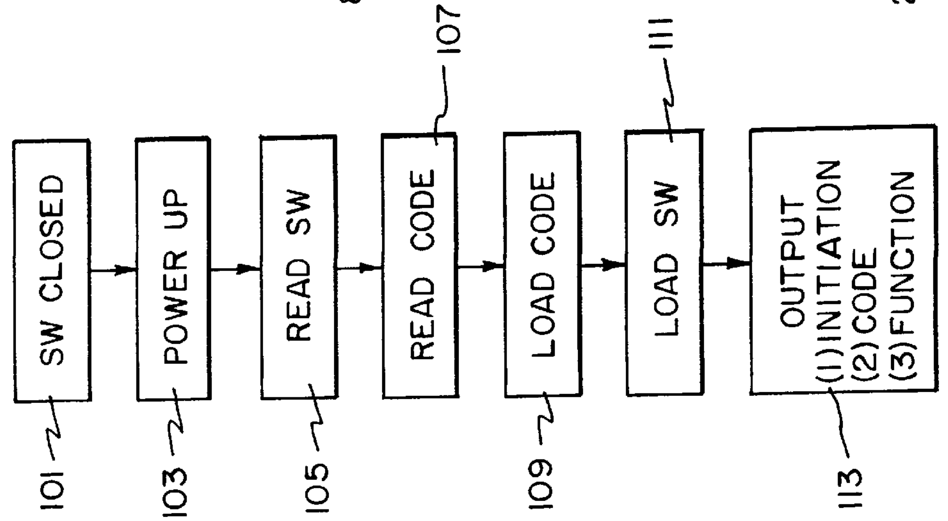
FIG. 4 is a block diagram schematically illustrating the system employed for generating coded information from the transmitting unit.

Referring also to the flow chart of FIG. 4, when one of the selector switches 12, 14 or 16 is closed (step 101), the transmitter $\mu$P 10 is powered up (step 103) via power-up circuit 20. Specifically, the power-up circuit 20 controls the output (5.0 volts) from the small batteries in the RKE transmitter T and directs power to the transmitter $\mu$P 10 for a preselected amount of time, sufficient to transmit one (1) control signal. Oscillators 30 and 32 are also activated by power-up circuit 20.

The transmitter $\mu$P 10 receives the initial signal and reads the function switch (FIG. 4, step 105) and the VAC (FIG. 4, step 107) associated with the transmitted signal. The VAC is permanently stored in the Security Code Register 40, a custom integrated circuit which preferably has a thirty-two bit register for storing a single code. This code is loaded into the register when the RKE transmitter T is manufactured. This code is unique and is not duplicated from one transmitter to the next. During the manufacturing of the transmitter, an appropriate program enable line 42 (FIG. 2), allows this single register to be loaded with the output of a random binary number generator. This code generation is performed by serially loading through line 46, of a number from a random number generator 44 located at the factory. Other random number generators can be used. However, the random number generator is not a permanent part of the transmitter and is used only to load the VAC into it.

When a function switch 12, 14, or 16 is depressed, the VAC is loaded into the appropriate RAM of the transmitter $\mu$P 10, along with the function of the depressed switch 12–14 (steps 109, 111). Thereafter, the transmitter $\mu$P 10 outputs an initiation signal or wake-up code which is generally over two bits of data, the VAC, which is usually thirty-two bits of data and the function code which, in a preferred embodiment, is at least 3 bits of binary data (step 113). The initiation or wake-up signal is a steady logic 1 for two or more bits and is contained in signal 38 (FIG. 2). Signal 38 is directed to the input of AND gate 39 along with the output of oscillator 30, so that the output of the gate 39 is a controlled version of the output of oscillator 30 which creates transmitted signal S. The remaining data bits, i.e. for the VAC and function code, can also pass over line 38. Signal S is then broadcast from antenna 36 and is received by antenna 61 for processing by receiver R.

In a preferred embodiment, the RKE receiver R (FIG. 2) includes a receiver microprocessor ("$\mu$P") 80, a Memory Register ("MR") 100, and a detector 60 which is tuned to approximately 315 MHz, to match the frequency of oscillator 30. The MR 100 includes a collection of security code registers and a comparator. The detector 60 includes a pass band filter for the carrier frequency and a circuit to remove the carrier so as to detect the envelope of the rf signal and produce the signal on a data bus or line 70. Thus, when the signal S is received from the RKE transmitter T, the detector 60 recognizes the frequency and allows the first portion of the signal to pass through on a signal recognizing line 62 to activate the RKE receiver's power-up circuit 64. Circuit 64 then provides an output voltage level that provides logic power to the receiver $\mu$P 80, e.g. 5.0 volts.

Like the transmitter $\mu$P 10, the receiver $\mu$P 80 includes a preprogrammed PROM together with appropriate RAM for processing information in accordance with the system parameters of the present invention. An oscillator 82, similar to oscillator 32, drives the receiver $\mu$P 80 and other circuits of the receiver. The receiver $\mu$P 80 is calibrated to compensate for variations between clocking oscillators 32 and 82. The two clocking oscillators 32 and 82 are set to the same frequency, meaning only that the frequencies of these two oscillators, when taken together with the processing performed by the microprocessors 10 and 80, produce the same general data transmission and data recognition. The actual oscillator frequencies could be different and still be generally matching in this context, such as by using different dividing networks.

The receiver $\mu$P 80 provides binary data, in serial form, to the memory register ("MR") 100 via data bus 90. In a preferred embodiment, the binary data includes only the VAC or security code portion of the transmitted signal S. The MR 100 is a custom integrated circuit having preprogrammed operating characteristics which are essentially to store data in memory locations that can be programmed electrically using standard EEPROM technology. The memory registers 100 are described in greater detail under the discussion of FIG. 5.

Upon receipt of the signal S, the receiver $\mu$P 80 queries the selected logic via line 92 to determine whether a WRITE signal was created. If not, the binary data on bus 90 is compared with the existing VACs in the memory register 100 to produce an appropriate COMPARE signal on output line 94. The COMPARE signal is communicated to the receiver $\mu$P 80, indicating that the coded portion of the receive signal S corresponds with one of the identification or security codes loaded in the registers of the MR 100.

After the transmitted signal has been properly identified, the function portion of the coded transmitted signal S will be decoded in the receiver $\mu$P 80. The appropriate serial message is supplied from the $\mu$P 80 through serial data line 122 to the BCM. The BCM will then perform the appropriate function. Note that the receiver $\mu$P 80 transfers only the VACs from bus 70 to line 90.

All of the circuits shown in FIG. 2 and so far discussed are somewhat standard solid state micro-chip components or are custom integrated circuits which can be produced using standard technology for accomplishing the defined functions.

Initial Receiver Programming

Before the RKE system may be used, the RKE transmitter code must be programmed into the receiver. In a preferred embodiment of the present invention, a known universal code is loaded into a control transmitter to be used at the factory for testing each receiver shipped to the automobile factory, before the receiver is installed in the vehicle. All memory registers 100 (discussed below) within each RKE receiver R may then be preset to this known universal code. Consequently, all receivers and control transmitters which are sent to the factory have the same universal code. Because each RKE transmitter T has its own unique code, having a control transmitter programmed universally into all receivers from the factory, ensures that the factory can work with and test each receiver without having to be concerned about matching particular transmitters with particular receivers mounted on particular vehicles.

Preferably, the enable bit 110 within the memory register 100 is not set when the receiver R is shipped to the automobile manufacturing or assembly plant. When the enable bit 110 is not set, a READ/WRITE signal on line 92 has no effect upon the logic of the registers contained in the code registers of the MR 100. Thus, no codes can be programmed into the RKE receiver R.

To perform the initial system programming, the program enable line 84 must be grounded/enabled by the BCM via a "diagnostic tool" (FIG. 1). This is done at the factory since the "diagnostic tool" is available only to the manufacturer and/or the dealer. The initial code is loaded into the receiver R, by using the "diagnostic tool" or "in-plant tester" to ground the program enable line 84. This sets the "enable bit" 110 located within the MR 100 (FIG. 2), signals the receiver μP 80 that the "program mode" is being entered, and creates a WRITE signal on line 92. The WRITE signal alerts the MR 100 that VACs will be entered.

Figure 5:
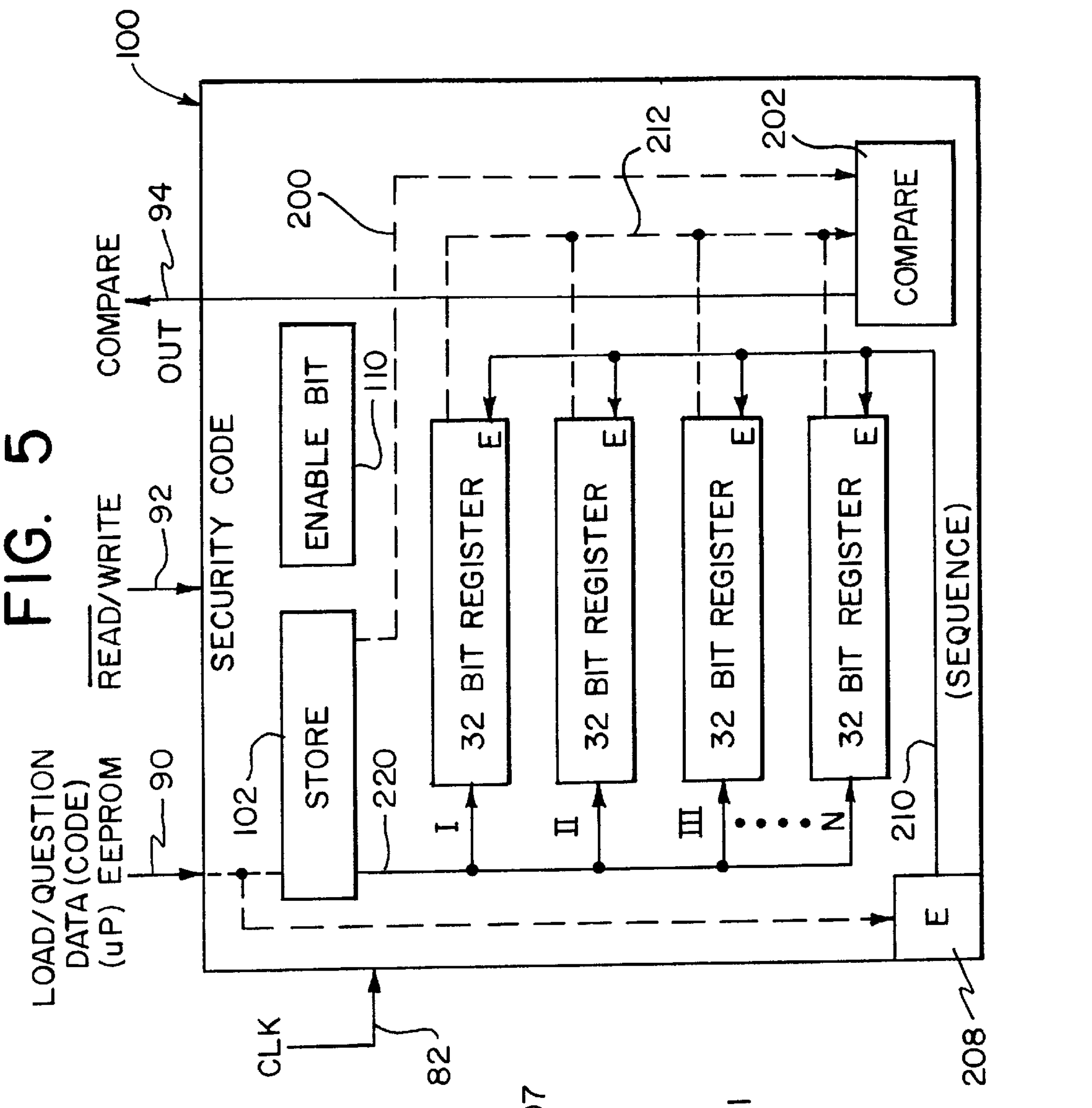
FIG. 5 is an architecture layout of the Memory Registers within the RKE receiver.

To enter the first VAC into the storage registers located within the MR 100, any function switch on the desired RKE transmitter T is depressed. This causes the VAC for that transmitter to be sent to the receiver R, decoded and entered into the thirty-two bit "store" register 102 of the MR 100 (FIG. 5). The enable network 208 simultaneously or in sequence loads the thirty-two bit code from store register 102 to the thirty-two bit registers (I-N) shown in FIG. 5. Loading of the code is illustrated by lines 210 and 220, where simultaneous loading or sequence loading is controlled by sequencing line 210. A register is loaded upon receipt of a signal at the E terminal by enable network 208. This loads each of the registers with the received code in register 102.

In a preferred embodiment, up to four thirty-two bit registers are employed. Therefore, the first code stored in register 102, when the WRITE signal in line 92 is enabled, is loaded into registers I to IV. Upon acknowledgement in the receiver μP 80 of a second new VAC, different from the code stored in register 102, the second new VAC replaces the first new code in register 102. If this happens before the WRITE signal on line 92 has expired, the next new stored code is loaded into all registers subsequent to register I (registers II to IV). Consequently, the second new code received during a single WRITE command will be loaded into register II, register III, etc. Upon receipt of a third new VAC, the same process is repeated, with the sequence network or control 208 loading the third new code into register III, and any subsequent registers in the MR 100. This process can continue until all registers are filled with a separate and distinct, new VAC. However, the complete loading procedure, must occur during a single WRITE command. As will be explained later, the WRITE signal remains enabled for a preselected time, such as 32 seconds in a preferred illustrative example.

In the above-described manner, the VACs in the memory registers are loaded by a procedure involving the grounding of line 84 and depressing either of the function switches 12, 14, or 16 on any RKE transmitter T. This easy procedure causes the first new code to be loaded into all designated registers within the MR 100. Repeating the procedure causes the other VACs to be loaded into the other memory registers.

Reprogramming the Receiver to Accept a New RKE Transmitter

Figure 7A:
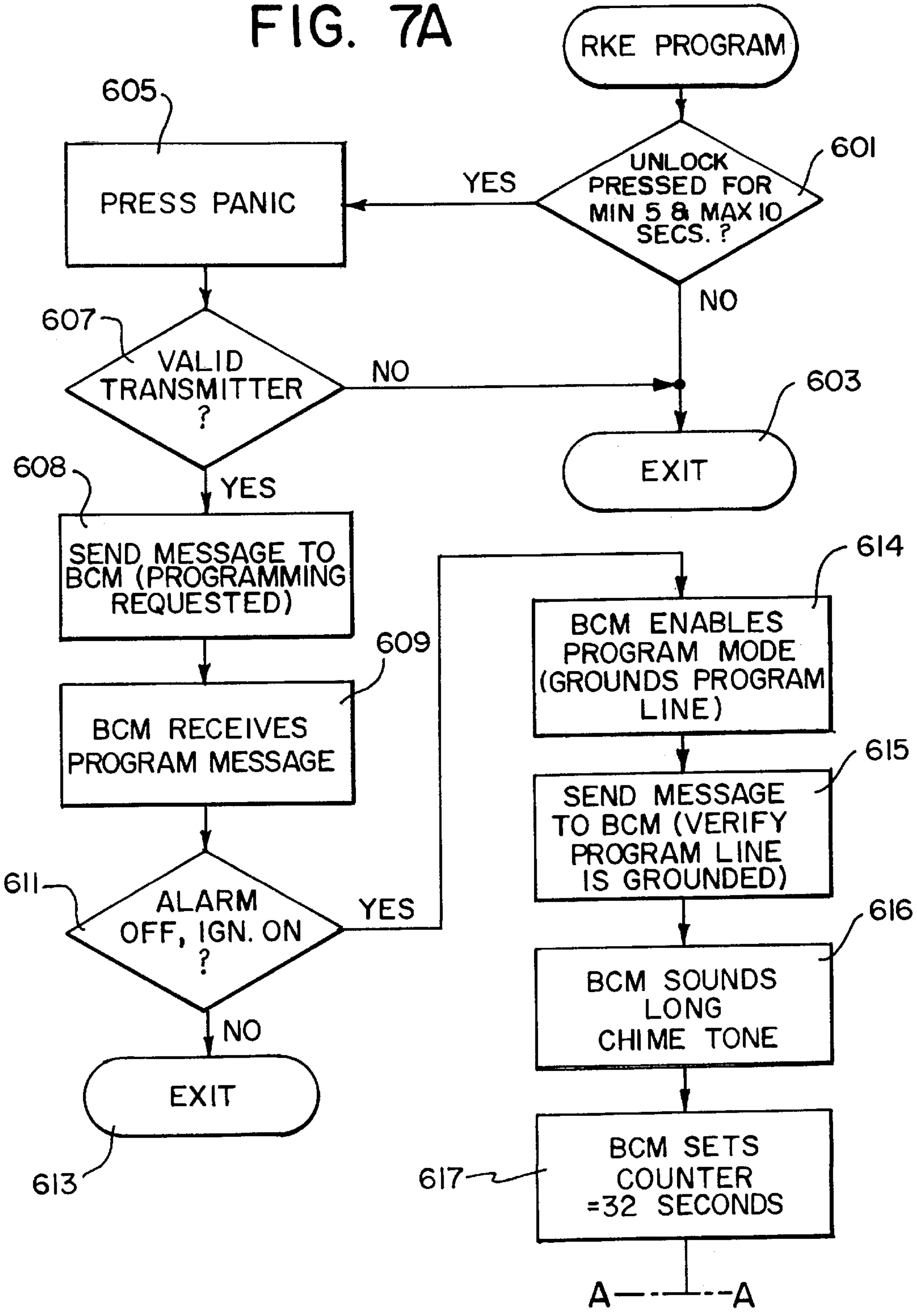
FIG. 7 is a flow chart divided into FIGS. 7A and 7B, illustrating the reprogramming feature of a preferred embodiment of this invention.
Figure 7B:
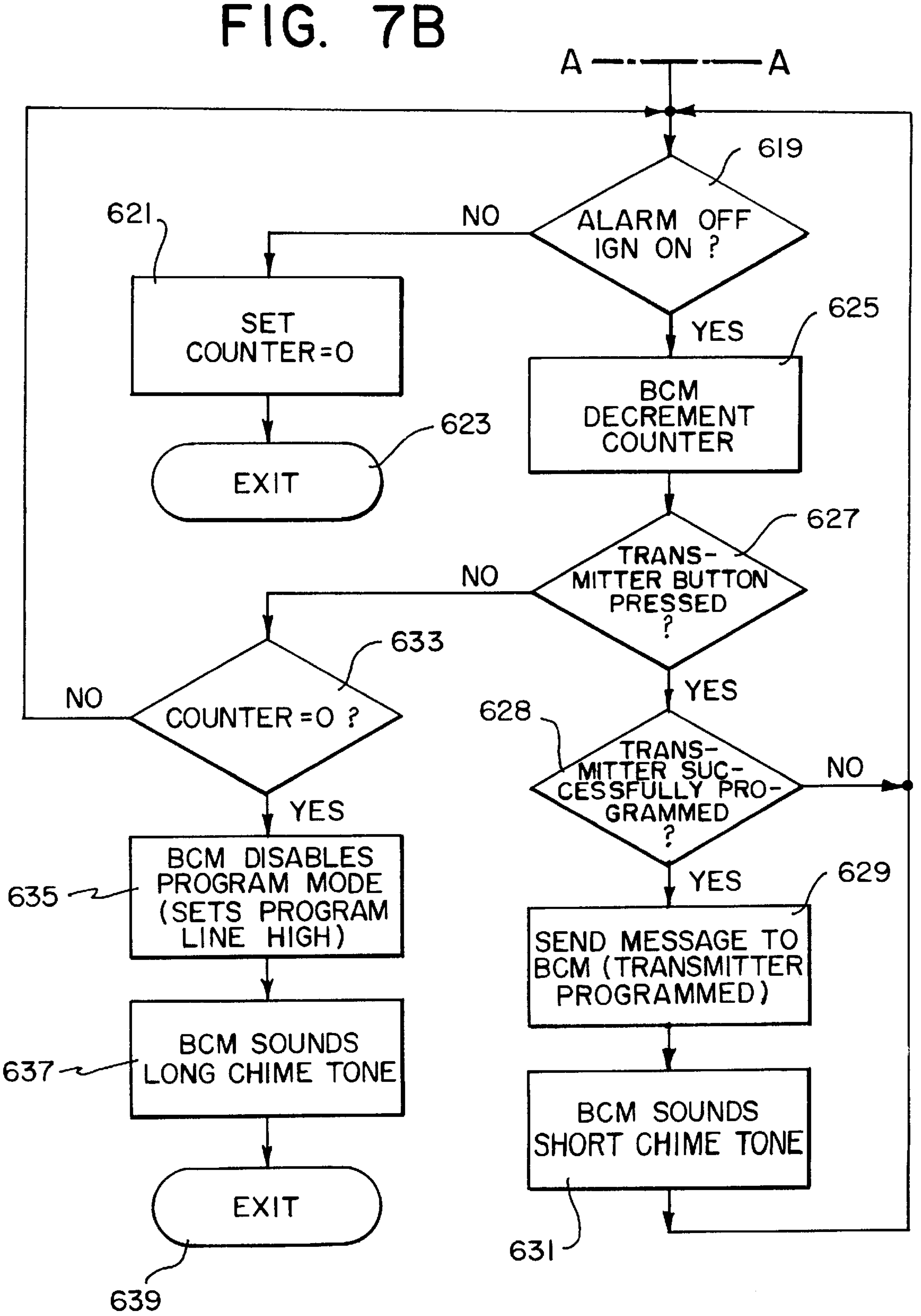

The flow chart illustrated by FIGS. 7A and 7B describes how the receiver R is reprogrammed by the customer by using an authorized RKE transmitter T instead of a "diagnostic tool." When the unlock function switch 14 is depressed (step 601), the RKE power-up circuit 20 is activated which directs power to the transmitter μP 10 and actuates oscillators 30 and 32. According to a preferred embodiment of the invention, a predetermined period is set to allow a "program" signal to be transmitted to the receiver R. For example, a 5 second to 10 second window may be set, during which time the transmitter μP 10 continues to interrogate the unlock switch 14 to determine whether the "program" function is being selected.

When the unlock function switch 14 is depressed, the transmitter μP 10 of the illustrative example above interrogates the unlock switch 14 continuously for 10 seconds. If the unlock switch 14 is released at any time before the beginning of the predetermined period for the program mode, in this example, 5 seconds, the program mode is exited (step 603). As described above (FIG. 2), other functions may be activated. If, however, the unlock function switch 14 is depressed for longer than 5 seconds but for less than 10 seconds, the transmitter μP 10 checks to see whether the panic function switch 16 has also been depressed within this 5 second to 10 second period (step 605). If not, the transmitter μP 10 exits the "program mode," and the circuit is deactivated to wait for another signal. If the panic function switch 16 is depressed within the 5 second to 10 second window, the RKE transmitter T sends a "program" signal to the RKE receiver R, alerting the RKE receiver R that the program function is being selected. The RKE receiver R reads the VAC transmitted as part of the "program" signal and compares this VAC against the codes stored within the 32-bit register 102 (FIGS. 5, 6) (step 607). If the VAC does not match one of the stored codes, a COMPARE signal is not generated in line 94. This implies that the reprogramming is being attempted with an unauthorized RKE transmitter. Therefore, the receiver exits the "program" function (step 603).

If the VAC matches one of the stored codes (a COMPARE signal is created on line 94) (step 607), the signal is sent to the BCM (step 608). The BCM microprocessor 150 (FIG. 1) looks to determine whether other predetermined conditions are met, for example, whether the ignition switch is turned on, or whether the vehicle alarm has been turned off (step 611). If these conditions are not met, the receiver again exits the "program mode" (step 613). However, if all the predetermined conditions are met, the BCM enables the "program mode" by grounding the program enable line 84 through RKE receiver R (FIG. 1) (step 614). The RKE receiver R verifies that the program line is grounded (step 615). The BCM will then sound a long chime tone to indicate to the authorized customer that the "program mode" is being entered (step 616). Grounding program enable line 84 also actuates an internal decrement counter in the BCM set at approximately 32 seconds (step 617). The BCM continually checks to ensure that the vehicle conditions are still met, for example, that the ignition switch is still on and the vehicle alarm is still off (step 619 in FIG. 7B). If these conditions are not met, the internal decrement counter is set to zero (0) (step 621) and the "program mode" is exited (step 623). If the vehicle conditions are met, the BCM enables "program mode" for 32 seconds in line 92 as the BCM decrement counter counts down (step 625).

The receiver μP 80 will remain in "program mode" until the time set in the BCM internal decrement counter expires (step 633) and the BCM disables the "program mode." If none of the function keys is depressed within the 32 seconds set in the BCM internal decrement counter (the decrement counter goes to 0), the BCM disables the "program mode" by setting the program enable line 84 to high (step 635). The BCM will sound another long chime tone to indicate to the customer that the "program mode" has been exited (step 637) and the "program mode" is thereafter exited (step 639).

If, however, a function on the RKE transmitter T is depressed (step 627), the VAC is loaded into all of the registers of the MR 100, deleting any VACs previously stored in the registers (step 628). A message is then sent to the BCM indicating that the RKE transmitter T is successfully programmed (step 629). The BCM will then send a short chime tone (step 631) to indicate to the customer that this RKE transmitter T has been successfully programmed into the receiver R. The BCM then checks its internal decrement counter to determine whether the time has expired (steps 619, 625, 627, 633). If the decrement counter is at 0 (step 633), the BCM will send a long chime tone (step 637) to indicate that the "program mode" is exited and the one RKE transmitter T has been successfully programmed. However, if the decrement counter 242 has not reached 0, the receiver μP 80 checks to see whether a function key on a different RKE transmitter T has been depressed (steps 619, 625, 627). If yes, then the VAC associated with this second RKE transmitter will be loaded into all of the registers within the MR 100, starting sequentially from the second register (step 628). Thus, the VAC from the first RKE transmitter T will be loaded into the first register only; the VAC from the second RKE transmitter will be loaded into all of the other registers.

In a preferred embodiment, there are 4 registers, allowing a customer to store up to 4 different RKE transmitter VACs into the MR 100. Again, a short chime will be sounded to signal the customer that another RKE transmitter T has been successfully programmed. This process is repeated until, either all four registers have been loaded, or the BCM internal decrement counter has reached 0, whichever condition occurs first.

When the BCM internal decrement counter reaches 0, the BCM disables the "program mode" (step 635) by setting the program enable line 84 to high. The BCM sounds a long chime tone to signal to the customer that the program mode has been exited (step 637).

As described above, the invention is distinct from prior art remote keyless entry systems, in that, the customer may use an authorized RKE transmitter T to reprogram new transmitters into the receiver R. Unlike the REMOTE CONTROL SYSTEM FOR DOOR LOCKS disclosed in the '221 patent, which only allows the receiver to be preprogrammed either at the dealer or at the factory by setting a hidden switch in order to ground the "program" line, the present invention allows the customer to reprogram the receiver in the event that a RKE transmitter is either lost or stolen, provided that at least one authorized transmitter is available. The present invention also allows the customer to add additional transmitters to the list of authorized transmitters that the receiver will recognize. It is only in the unlikely event that every authorized transmitter is misplaced that the customer would have to return to the dealer to have a new RKE transmitter programmed into the RKE system.

While the invention has been particularly shown and described with reference to a preferred embodiment thereof, it will be understood by those skilled in the art that various changes in form and details may be made therein without departing from the spirit and scope of the invention.

We claim:

1. A remote keyless entry system includes a remote transmitting unit capable of transmitting combined code and function signals to a receiver module in order to direct the receiver module to perform requested functions when the code signal corresponds to a code signal stored at the receiver module, comprising:

a programmable memory device in the receiver module, said memory device storing at least one code signal when it receives a write signal;

a decoder in the receiver module, said decoder recognizing a particular pattern of function signals from a transmitting unit with a code signal matching at least one code signal previously stored in the programmable memory device and producing a write signal for a certain period of time in response to such recognition, said write signal enabling code signals to be stored in said programmable memory device; and a controller in the receiver which directs said memory device to erase all stored code signals in response to receiving a code signal during the write signal and to store in separate memory locations code signals which are sent to the receiver module from transmitters during the write signal.

2. The system of claim 1 wherein the code signal is a multi-bit binary code.

3. The system of claim 1 wherein the memory device is capable of storing up to four code signals.

4. The system of claim 1 wherein the decoder and controller comprises a microprocessor and a comparator.

5. The system of claim 1 wherein the system is a vehicle entry system, the transmitter is in a portable key fob, the receiver module, and a vehicle body controller that locks and unlocks doors of the vehicle in response to requests activated by buttons on the transmitter.

6. A method of programming a remote keyless entry system that includes a remote transmitting unit with buttons for causing the transmission of combined code and function signals to a receiver module so as to direct the receiver module to perform requested functions when the code signal corresponds to a code signal stored in a programmable memory device at the receiver module, comprising the steps of:

activating at least one specified button on a transmitting unit for a predetermined amount of time;

if the code signal for the transmitter matches at least one code signal stored at the receiver, generating a write signal to put the receiver module in a code signal programming mode;

starting an interval counter in response to the write signal to count for a certain period of time;

clearing all code signals stored in the memory device at the receiver in response to the write signal and a subsequent reception of a code signal; and storing in the memory device code signals from transmitters which are received during the certain period of time.

7. The method of claim 6 further including the step of creating a sensible signal upon storing of each code signal to acknowledge to the customer that the new code has been accepted.

8. The method of claim 7 wherein the sensible signal is a chime.

* * * * *